US008483738B2

(12) United States Patent
Kemery et al.

(10) Patent No.: US 8,483,738 B2
(45) Date of Patent: Jul. 9, 2013

(54) CHORE AND REWARDS TRACKER

(75) Inventors: Michael Kemery, Seattle, WA (US);
Winston Wang, Seattle, WA (US);
Marianna Wickman, Seattle, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 556 days.

(21) Appl. No.: 12/731,698

(22) Filed: Mar. 25, 2010

(65) Prior Publication Data
US 2011/0237227 A1 Sep. 29, 2011

(51) Int. Cl.
*H04B 7/00* (2006.01)
*G09B 19/00* (2006.01)

(52) U.S. Cl.
USPC ............................ 455/517; 455/66.1; 434/238

(58) Field of Classification Search
USPC ... 455/500, 517, 550.1, 556.1, 66.1; 715/771, 715/772; 726/21; 434/238
See application file for complete search history.

(56) References Cited

U.S. PATENT DOCUMENTS

| 5,023,907 | A | 6/1991 | Johnson et al. |
| 6,767,212 | B2 | 7/2004 | Thomas |
| 6,889,212 | B1 | 5/2005 | Wang et al. |
| 7,046,139 | B2 | 5/2006 | Kuhn et al. |
| 7,218,912 | B2 | 5/2007 | Erskine et al. |
| 7,302,272 | B2 | 11/2007 | Ackley |
| 7,415,711 | B2 | 8/2008 | Chew et al. |
| 2001/0018660 | A1 | 8/2001 | Sehr |
| 2002/0156792 | A1 | 10/2002 | Gombocz et al. |
| 2003/0078036 | A1 | 4/2003 | Chang et al. |
| 2004/0166878 | A1 | 8/2004 | Erskine et al. |
| 2004/0180648 | A1 | 9/2004 | Hymel et al. |
| 2004/0235520 | A1 | 11/2004 | Cadiz et al. |
| 2005/0096009 | A1 | 5/2005 | Ackley |
| 2005/0125819 | A1 | 6/2005 | Ono et al. |
| 2006/0101499 | A1 | 5/2006 | Aravamudan et al. |
| 2006/0121428 | A1 | 6/2006 | Terrazas |
| 2006/0122938 | A1 | 6/2006 | Hicks et al. |
| 2006/0143047 | A1 | 6/2006 | Briegs et al. |
| 2006/0143622 | A1 | 6/2006 | Prabandham et al. |
| 2006/0189348 | A1 | 8/2006 | Montulli et al. |
| 2006/0194181 | A1 | 8/2006 | Rosenberg |
| 2006/0224943 | A1 | 10/2006 | Snyder et al. |

(Continued)

FOREIGN PATENT DOCUMENTS

| KR | 20010096407 | 11/2001 |
| KR | 20020066804 | 8/2002 |

(Continued)

OTHER PUBLICATIONS

Office Action for U.S. Appl. No. 12/544,881, mailed on Apr. 11, 2012, Kemery, "Parent Telecommunication Device Configuration of Activity-Based Child Telecommunication Device", 17 pages.

(Continued)

*Primary Examiner* — Nguyen Vo
(74) *Attorney, Agent, or Firm* — Lee & Hayes, PLLC

(57) ABSTRACT

A parent telecommunications device may assign chores to an activity-based child device and unlock functionality on the child device when a one or more chores is completed. The child device creates a graphical menu showing a chore list including the chores received from the parent device. The child device recognizes chores as completed based on an indication received from the user of the child device, the user of the parent device, or both.

21 Claims, 8 Drawing Sheets

U.S. PATENT DOCUMENTS

| | | | |
|---|---|---|---|
| 2006/0242242 A1 | 10/2006 | Ezumi et al. | |
| 2006/0255119 A1 | 11/2006 | Marchasin et al. | |
| 2006/0258341 A1 | 11/2006 | Miller et al. | |
| 2006/0270395 A1 | 11/2006 | Dhawan et al. | |
| 2007/0006327 A1 | 1/2007 | Lal et al. | |
| 2007/0021145 A1 | 1/2007 | Lam | |
| 2007/0037563 A1 | 2/2007 | Yang et al. | |
| 2007/0039025 A1 | 2/2007 | Kraft et al. | |
| 2007/0058637 A1 | 3/2007 | Lo | |
| 2007/0070404 A1 | 3/2007 | Caradec et al. | |
| 2007/0081075 A1 | 4/2007 | Canova et al. | |
| 2007/0198413 A1 | 8/2007 | Nagao | |
| 2007/0250382 A1 | 10/2007 | Beck | |
| 2008/0064381 A1 | 3/2008 | Ackley | |
| 2008/0070608 A1 | 3/2008 | Ackley | |
| 2008/0070609 A1 | 3/2008 | Ackley | |
| 2008/0096544 A1 | 4/2008 | McNamara et al. | |
| 2008/0096603 A1 | 4/2008 | Sparre | |
| 2008/0140433 A1 | 6/2008 | Levy et al. | |
| 2008/0162305 A1 | 7/2008 | Rousso et al. | |
| 2008/0181201 A1 | 7/2008 | Park et al. | |
| 2008/0209577 A1 | 8/2008 | Vrielink et al. | |
| 2008/0233944 A1 | 9/2008 | Tu | |
| 2008/0246605 A1 | 10/2008 | Pfeffer et al. | |
| 2008/0256641 A1 | 10/2008 | Lo | |
| 2008/0288966 A1 | 11/2008 | Maes | |
| 2008/0299527 A1* | 12/2008 | Groot et al. | 434/238 |
| 2008/0307324 A1 | 12/2008 | Westen et al. | |
| 2009/0005000 A1 | 1/2009 | Baker et al. | |
| 2009/0006116 A1 | 1/2009 | Baker et al. | |
| 2009/0006200 A1 | 1/2009 | Baker et al. | |
| 2009/0015653 A1 | 1/2009 | Baek | |
| 2009/0018963 A1 | 1/2009 | Abu-Amara | |
| 2009/0038005 A1* | 2/2009 | Howarth | 726/21 |
| 2009/0054092 A1 | 2/2009 | Stonefield et al. | |
| 2009/0069084 A1 | 3/2009 | Reece et al. | |
| 2009/0106110 A1 | 4/2009 | Stannard et al. | |
| 2009/0143007 A1 | 6/2009 | Terlizzi | |
| 2009/0148824 A1 | 6/2009 | Argott | |
| 2009/0149205 A1 | 6/2009 | Heredia et al. | |
| 2009/0199178 A1 | 8/2009 | Keller et al. | |
| 2009/0209240 A1 | 8/2009 | Mahowald | |
| 2009/0225788 A1 | 9/2009 | Kephart et al. | |
| 2009/0254656 A1* | 10/2009 | Vignisson et al. | 709/224 |
| 2009/0282005 A1 | 11/2009 | Kim et al. | |
| 2009/0317778 A1 | 12/2009 | Oberman | |
| 2010/0039254 A1 | 2/2010 | Cooper et al. | |
| 2010/0122170 A1 | 5/2010 | Girsch et al. | |
| 2010/0235476 A1 | 9/2010 | Lin et al. | |
| 2010/0241530 A1* | 9/2010 | Murset | 705/27 |
| 2010/0299712 A1 | 11/2010 | Austin et al. | |
| 2010/0322234 A1 | 12/2010 | Kodaka | |
| 2011/0065419 A1 | 3/2011 | Book et al. | |
| 2011/0202863 A1* | 8/2011 | Corrallo | 715/772 |
| 2012/0066088 A1* | 3/2012 | Murset | 705/26.8 |

FOREIGN PATENT DOCUMENTS

| | | | |
|---|---|---|---|
| KR | 20060108093 A | 10/2006 | |
| KR | 20070005163 A | 1/2007 | |
| KR | 20070017229 A | 2/2007 | |
| WO | WO2010008509 A2 | 1/2010 | |

OTHER PUBLICATIONS

Non-Final Office Action for U.S. Appl. No. 12/731,717, mailed on Feb. 16, 2012, Winston Wang et al, "Shared Book Reading", 25 pages.

Non-Final Office Action for U.S. Appl. No. 12/732,103, mailed on Apr. 11, 2012, Marianna Wickman, et al., "Parent-Controlled Episodic Content on a Child Telecommunication Device", 10 pages.

Non-Final Office Action for U.S. Appl. No. 12/544,404, mailed on Apr. 26, 2012, Winston Wang et al, "Shareable Applications on Telecommunications Devices", 10 pages.

Final Office Action for U.S. Appl. No. 12/544,464, mailed on Jun. 1, 2011, Michael Kernery, "Licensed Content Purchasing and Delivering".

PCT Search Report & Written Opinion mailed Jun. 27, 2011 for PCT Application No. PCT/US10/45996.

Oomble.com, "Frequently Asked Questions", Last Revised Aug. 22, 2007, Retrieved from <<http//web.archive.org/web/20080122014735/www.oomble.com/public/faq.jsp>> on Jan. 18, 2011, 12 pages.

PCT International Search Report and Written Opinion mailed Mar. 29, 2011 for PCT Application No. PCT/US10/45991, 10 pgs.

PCT International Search Report and Written Opinion mailed Apr. 15, 2011 for PCT Application No. PCT/US10/45722, 10 pgs.

Office Action for U.S. Appl. No. 12/544,881, mailed on Sep. 6, 2011, Kemery et al., "Parent Telecommunication Device Configuration of Activity-Based Child Telecommunication Device", 15 pages.

The PCT Search Report & Written Opinion mailed Oct. 27, 2011 for PCT Application No. PCT/US11/28527, 11 pages.

The PCT Search Report & Written Opinion mailed Oct. 31, 2011 for PCT Application No. PCT/US11/28545, 8 pages.

The PCT Search Report & Written Opinion mailed Nov. 30, 2011 for PCT Application No. PCT/US11/28371, 10 pages.

"AT&T Video Share Lets Wireless Customers Share Live Video", retrieved from <<http://www.att.com/gen/press-room?pid=9199>> on Feb. 26, 2009, 2 pages.

"Back to MediaCast FAQ", retrieved from <<http://vumenow.com/support mediashare.php?faq=1>> on Feb. 26, 2009, 2 pages.

Beck, "An Allowance That's Measured in Minutes, Not Cents," retrieved at <<http://www.nytimes.com/2007/11/25/business/yourmoney/25allowance.html?_r=2&pagewanted=print, Nov 25, 2007, 3 pgs.

"Cingular to roll out video/chat service", The Seattle Times: Tech Tracks, retrieved from <<http://blog.seattletimes.nwsource.com/techtracks/archives/2006/06/cingular_to_roll_out_videochat_service_1.html>>, Jun. 28, 2006, 2 pages.

GSM Association, "Image Share Interoperability Specification 1.1", Official Document IR.79, Apr. 10, 2008, 13 pages.

GSM Association, "Video Share Interoperability Specification 1.3", Official Document IR.74, Oct. 30, 2008, 18 pages.

"My Reward Board," retrieved at http://www.myrewardboard.com/>> on Mar. 24, 2010, available as early as Jan. 25, 2010, 1 pg.

Raffle, et al., "Family Story Play: Reading with Young Children (and Elmo) Over a Distance", CHI 2010, Apr. 10-15, 2010, Atlanta, Georgia, 10 pages.

Yarosh et al., "Developing a Media Space for Remote Synchronous Parent Child Interaction", IDC 2009, Jun. 3-5, 2009, Como, Italy, 10 pages.

Final Office Action for U.S. Appl. No. 12/544,404, mailed on Oct. 19, 2012, Winston Wang et al, "Shareable Applications on Telecommunications Devices", 7 pages.

Final Office Action for U.S. Appl. No. 12/731,717, mailed on Aug. 16, 2012, Winston Wang et al, "Shared Book Reading", 16 pages.

Final Office Action for U.S. Appl. No. 12/732,103, mailed on Aug. 23, 2012, Marianna Wickman, et al., "Parent-Controlled Episodic Content on a Child Telecommunication Device", 13 pages.

Non-Final Office Action for U.S. Appl. No. 12/731,698, mailed on Aug. 30, 2012, Michael Kemery et al., "Chore and Rewards Tracker", 7 pages.

Non-Final Office Action for U.S. Appl. No. 12/544,464, mailed on Mar. 27, 2013, Michael Kernery, "Licensed Content Purchasing and Delivering", 11 pages.

Final Office Action for U.S. Appl. No. 12/544,464, mailed on May 23, 2013, Michael Kernery, "Licensed Content Purchasing and Delivering", 12 pages.

* cited by examiner

US 8,483,738 B2

CHORE AND REWARDS TRACKER

BACKGROUND

In the last few years telecommunications devices, such as cellular phones, landline phones and IP-based phones, have become more and more capable, offering an increasing array of functions. Once limited to simple point-to-point voice communications, telecommunications devices have evolved into so-called "smart phones" that offer many different modes of telecommunication, such as voice, video, text messaging, instant messaging, email, and other modes of communication. Furthermore, modern smart phones have capabilities approaching those of more traditional desktop computers, including the ability to load and run third party applications. Applications are available for business use, as well as for personal use, education, and entertainment.

Many people view their telecommunications devices as critical to daily life: necessary for coordinating both business and personal activities. Among many families, cell phones, in particular, are becoming a primary means of communication interaction between parents and children. This allows parents to keep in touch with their children; however, once a child has a cellular phone parents frequently have little control over the extent to which it is used or misused.

The advanced capabilities of modern communications devices create a variety of opportunities for access to information, as well as opportunities for interactions between users of these communication devices. Unfortunately, these opportunities are accompanied by costs, usually paid for by the parents, and the potential to distract children from other activities such as homework. Parents usually want to control access to functionalities on a cellular phone in order to protect their children from inappropriate content, minimize fees incurred by a child's activities, and minimum amount of distraction provided by devices that can be used to play games and surf the web.

Some telecommunications devices can indeed be configured to limit their communications capabilities. For example, a phone might be configured to accept telephone calls only from specified parties such as parents. Likewise, the phone might be configured to only allow certain outgoing calls. Access to content and activities can be similarly limited. However, these types of configuration choices are inflexible and mainly exclusionary. They do not allow the parent to control how and when a child uses the phone.

BRIEF DESCRIPTION OF THE DRAWINGS

The detailed description is set forth with reference to the accompanying figures, in which the left-most digit of a reference number identifies the figure in which the reference number first appears. The use of the same reference numbers in different figures indicates similar or identical items or features.

DETAILED DESCRIPTION

Figure 1:
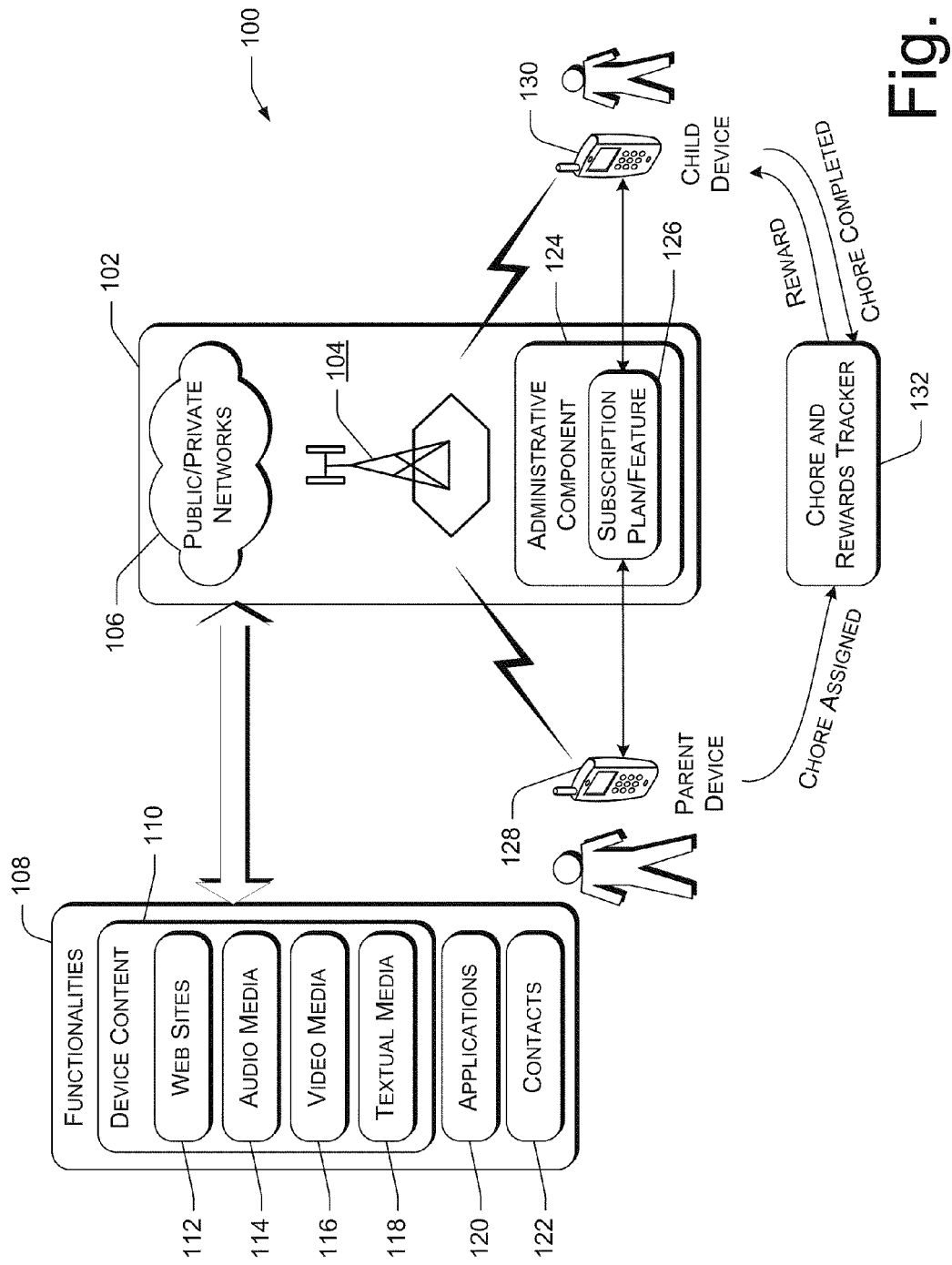
FIG. 1 is a block diagram of a telecommunications network and system including a parent device and a child device.

FIG. 1 illustrates a telecommunications system 100 that facilitates voice and other modes of communication between a parent device and an activity-based child device. Although the terms "parent device" and "child device" are used herein, a "parent device" is any type of device that can controls, either directly or via an alternate interface (such as a desktop or Web interface) the activities available to a user of a "child device," regardless of whether the specific users of the "parent device" and "child device" have a parent-child relationship. In the described example, system 100 is a cellular telecommunications system which is accessed by wireless communications devices such as portable telephone handsets, smart phones, PDA phones, pagers, portable computers, and various other types of portable devices having wireless communications capabilities. Telecommunications system 100 may be any other type of telecommunications system, such as a landline telecommunications system, an IP-based telecommunications system, or a converged telecommunications system (such as an Unlicensed Mobile Access or UMA system).

Telecommunications system 100 includes a network 102 which in turn comprises an infrastructure 104 (in this example, a cellular infrastructure) connected for communications with one or more private networks and/or one or more public networks (such as the Internet) 106. Telecommunications network 104 is represented by a cell tower commonly associated with a cellular telecommunications network, although other types of mobile technologies might also be used.

Originally intended to implement voice communications, cellular networks and other wireless communications systems now support many different types of communications, such as video, instant messaging, email, text messaging (e.g., Short Message Service or SMS messaging), multimedia messaging (e.g., Multimedia Message Service or MMS messaging), etc. Systems such as telecommunications system 100 may also provide access to the Internet. Modern telecommunication devices have advanced capabilities that allow them to utilize the wide range of resources and activities available through the Internet.

Telecommunications network 104 utilizes various technologies and protocols for implementing different modes of communications with and between telecommunications devices. Telecommunications network 104 supports voice communications as well as data communications. Telecommunications devices utilizing telecommunications network 104 can conduct various types of communications with other telecommunications devices supported by telecommunications network 104, as well as with devices and resources connected to private/public network(s) 106.

Numerous carriers maintain large communications networks as examples of telecommunications network 104. T-Mobile, as one example, is a large mobile network operator that maintains a world-wide wireless communications infrastructure. Other operators maintain independent mobile networks, and there is a degree of cooperation and interoperability between networks. At the least, users of one mobile network can call and communicate with users of different fixed, IP-based, mobile, and converged networks. In addition, users can communicate with each other through various Internet communication techniques, made possible by the connection of the various mobile networks to the Internet.

By virtue of the connection of telecommunications network 104 to private/public network(s) 106, system 100 encompasses all the different resources available to users of such network(s), as well as other resources that might be made available exclusively to users of telecommunications network 104. For purposes of this description, these resources are categorized and shown in FIG. 1 as functionalities 108, and include any type of device content 110 both stored locally on the device and available from the network(s) 106 as downloadable content, streaming content, or the like. Device content may include but is not limited to web sites 112, audio media 114, video media 116, and textual media 118. All of the device content may be consumed on the child device 130. The functionalities 108 may also include any type of executable application 120 or contacts 122 who can be contacted by voice calls, emails, instant messages or other modes of communication.

A web site 112 is a collection of related web pages or views, including text, graphics, images, videos, audio, or other content. A particular web site 112 is typically accessed by a URL or domain name. Device content 110 is static information or files that can be downloaded to a user's device and rendered locally. Music/audio books 114, pictures/videos 116, and electronic books 118 are examples of device content. Applications 120 are programs that can be downloaded to a user's device and executed locally.

Devices used with telecommunications network 104 operate under network subscription plans that define the terms, features, and fees under which network use is granted. For example, a voice subscription plan might allow a predefined number of minutes per month of network voice call usage. A data subscription plan might indicate a predefined quantity of data that can be exchanged per month—such as one gigabyte. Voice and data might be combined into a single plan which allows both voice and data usage.

One or more telecommunications devices are allowed to participate and utilize the services provided by each subscription plan. The carrier typically provisions or configures each telecommunications device for use on the carrier's network. Part of the configuration process involves linking the telecommunications device to the plan—this is also referred to as "activating" the device. Some carriers use removable Subscriber Identity Modules (SIM cards) to store subscriber information for a particular subscription plan. The SIM card is tied to a particular user account and can be inserted into a device to enable that device to function under the user's account.

Configuration also includes setting various device parameters for the specific characteristics of the carrier's network and the plan under which the telecommunications device will operate. In practice, telecommunications devices are often pre-configured for specific mobile networks.

Telecommunications network 104 has an administrative component 124 that tracks individual devices, authorizes device access to the network, and limits device usage to the specific features and allocations that are included in the applicable subscription plans. Administrative component 124 keeps track of minutes and data quantities used, provides accounting and billing information, and in some cases provides resources for use by telecommunications devices on network 104.

FIG. 1 illustrates a new type of multi-user subscription plan or feature 126 in which one telecommunications device is designated as a parent device 128, and another telecommunications device is designated as a child device 130. The parent device 128 is a normal or specially configured telecommunications device. The child device 130 is a specially configured telecommunications device, with features that allow a user of a parent device 128 to configure the child device 130 remotely, and to thereby enable and/or disable functionality on the child device 130. For example, if a user of parent device 128 wishes to designate chores for the user of child device 130, the user of the parent device 128 may assign chores using a chore and rewards tracker 132. The user of the child device 130 may indicate to the chore and rewards tracker 132 that the chore is completed. In exchange for completing the chore the user of the child device 130 may gain access to a functionality on the child device 130 that he or she could not access before.

The chore and rewards tracker 132 comprises a series of executable instructions (e.g., software) for tracking chores and rewards for the user of the child device 130. Although shown as a separate module in FIG. 1, the chore and rewards tracker 132 may be implemented in whole or part by any combination of the parent device 128, the child device 130, the administrative component 124, or another device such as a server computer coupled to the network(s) 106.

Figure 2:
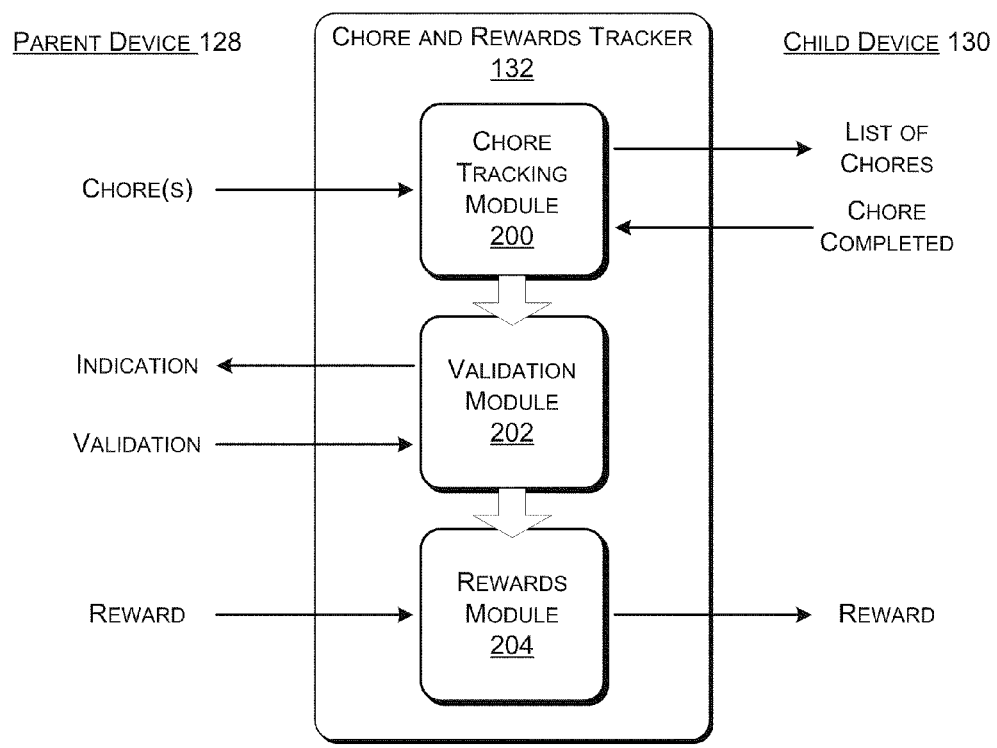
FIG. 2 is block diagram showing components of a chore and rewards tracker.

FIG. 2 shows the chore and rewards for 132 from FIG. 1 in greater detail. In one embodiment, the chore and rewards tracker 132 comprises a chore tracking module 200, a validation module 202, and a rewards module 204. The chore tracking module 200 keeps track of chores transmitted to the child device 130 from the parent device 128 and chores completed by the user of the child device 130. Chores may be added one at a time or an entire list of chores may be added (e.g., a daily chore list or a weekly chore list). A list of chores generated by the chore tracking module 200 is displayed, for example, on a touch-screen display of the child device 130. The chore tracking module 200 also receives an indication that a chore from the list of chores was completed by the user of the child device 130. The indication may be generated, for example, by the user of the child telecommunications device 130 checking a box or pushing a button. In some embodiments, the indication may be generated automatically by the child device 130. For example, if the chore is to interact with educational software on the child device 130, the educational software may generate the indication that the chore is complete once the child has finished a lesson or problem set.

The validation module 202 validates completion of a chore. The mechanism for validating that a chore was actually completed may vary depending on a level of trust between the user of the parent device 128 (e.g., a parent) and the user of the child device 130 (e.g., a child). For example, if a high level of trust exists, an indication from the child that a chore was completed is sufficient to validate completion of the chore. Thus, some implementations may omit the validation module 202 so that an indication a chore is completed may be passed directly to the rewards module 204. However, if a lower level of trust exists, the parent may wish to confirm that the chore was actually completed. In such a situation the validation module 202 transmits an indication that the chore was completed to the parent device 128. The parent may then check that the chore was completed by directly observing the child's behavior, calling or texting another adult who is with the child, viewing a picture of the completed chore sent by the child (e.g., a picture taken by a camera in the child device 130), or by another mechanism. Once satisfied that the chore was actually completed the parent may recognize the chore as completed and then the validation module 202 receives a validation from the parent device 128.

The rewards module 204 unlocks a functionality 108 of the child device 130 in response to the indication that the chore was completed. The functionality 108 provided to the child device 130 is the reward. Thus, the reward may comprise a functionality on the child device 130. The user of the parent device 128 may determine which functionality 108 is provided as the reward for completion of a given chore. For example, a more difficult chore may be associated with a larger reward. The corresponding award for a chore is provided by the parent device 128 to the rewards module 204. In one embodiment, the rewards module 204 unlocks a functionality of the child device 130 when all chores on the list of chores are completed. For example, a larger reward may be provided when all chores are complete or rewards may be provided only when the child has completed all of his or her chores.

Figure 3:
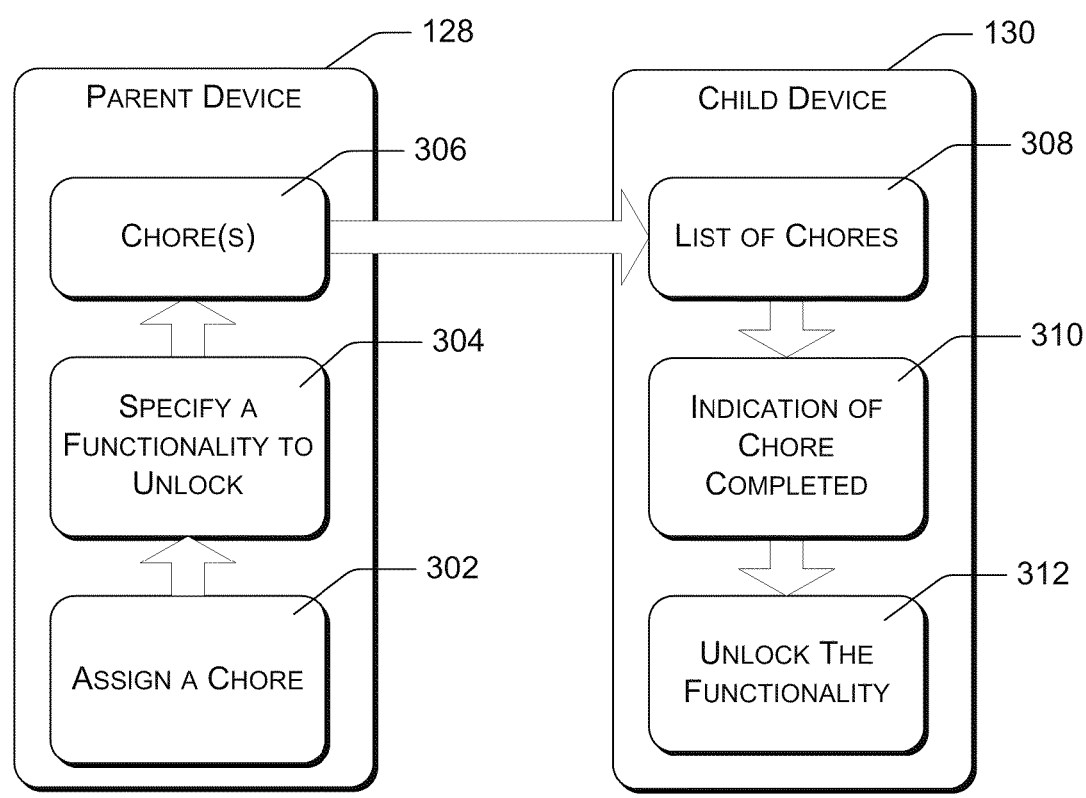
FIG. 3 is a block diagram illustrating how a child device can receive a list of chores from a parent device and unlock a functionality of the child device upon completing a chore.

FIG. 3 shows one way in which a list of chores might be assigned from a parent telecommunications device 128 to a child telecommunications device 130. In this embodiment, the user of the parent device 128 assigns a chore 302. The chore may be selected from a list of possible chores or entered as a new chore. The user of the parent device 128 also specifies a functionality of the child device to unlock 304 when the chore is completed. The one or more chores 306 and the associated rewards (i.e., functionalities) are received at the child device 130. This transmission may go through the telecommunications network 104.

The user of the parent device 128 can specify Internet sites, contacts, applications, pictures, music, games, and other functionalities to be unlocked or enabled on the child device 130. Other information can also be associated with each functionality, such as descriptions, telephone numbers, email addresses, resource identifiers, URLs, file locations, and other types of information relevant the respective functionality.

The user of parent device 128 can add functionalities corresponding to different contacts, so that the child device 130 displays icons for calling, emailing, or texting specific people, as rewards for completing a chore. The user of the parent device 128 may also partially unlock, or partially enable a functionality of the child device 130. For example, the child device 130 may allow the user to communicate with family members at any time, but prevent communication with contacts designated as friends until all the chores in the list of chores 308 are completed. Similarly, the user of parent device 128 can specify particular applications to be executed on the child device 130 once a chore is completed. For example, game applications on the child device 130 may be unlocked once the chore of "clean room" is completed. As a further example, the user of parent device 128 can designate specific device content such as movies or songs as functionality that is provided on the child device 130 once a chore is completed. This device content may be stored locally on the child device 130 and rendered inaccessible until the corresponding chore is completed or the content may be remote from the child device 130 (e.g., on the parent device 128 or stored in the network 106) and downloaded or pushed to the child device 130 after an indication that the chore is completed has been received.

Chore assignments received by the child device 130 are placed into a list of chores 308. The child device 130 may use the chore assignments from more than one parent device 128. For example, both a mother and a father may use their respective telecommunication devices to place chores into the list of chores 308 on their child's device 130. Additionally, chores may be removed from the list of chores 308 by the parent device 128, for example, a chore to "mow the lawn" may be removed or suspended if the weather turns to rain. The list of chores 308 is presented to the user of the child device 130 on, for example, a graphical user interface of the child device 130. The operating system, or other component, of the child device 130 is configured to limit the activities available to the user of child device 130 based on the status of chores on the list of chores 308 as completed or not completed.

The child device 130 is configured to process an indication that a chore is completed 310 and unlock the functionality 312 associated with that chore. As discussed above, if the parent trusts that the child will complete his or her chores, the indication that a chore is completed may be entered by the child. Alternatively, the child device 130 may be configured to require validation by the parent device 128 before designating a chore as completed.

In one embodiment, changes to the list of chores 308 on the child device 130 are automatically communicated to the parent device 128. A list of the chores completed and the chores to be done on the parent device 128 may be updated to mirror the content of the list of chores 308 on the child device 130. This mechanism allows a parent to monitor progress of a child towards completing his or her chores.

Figure 4:
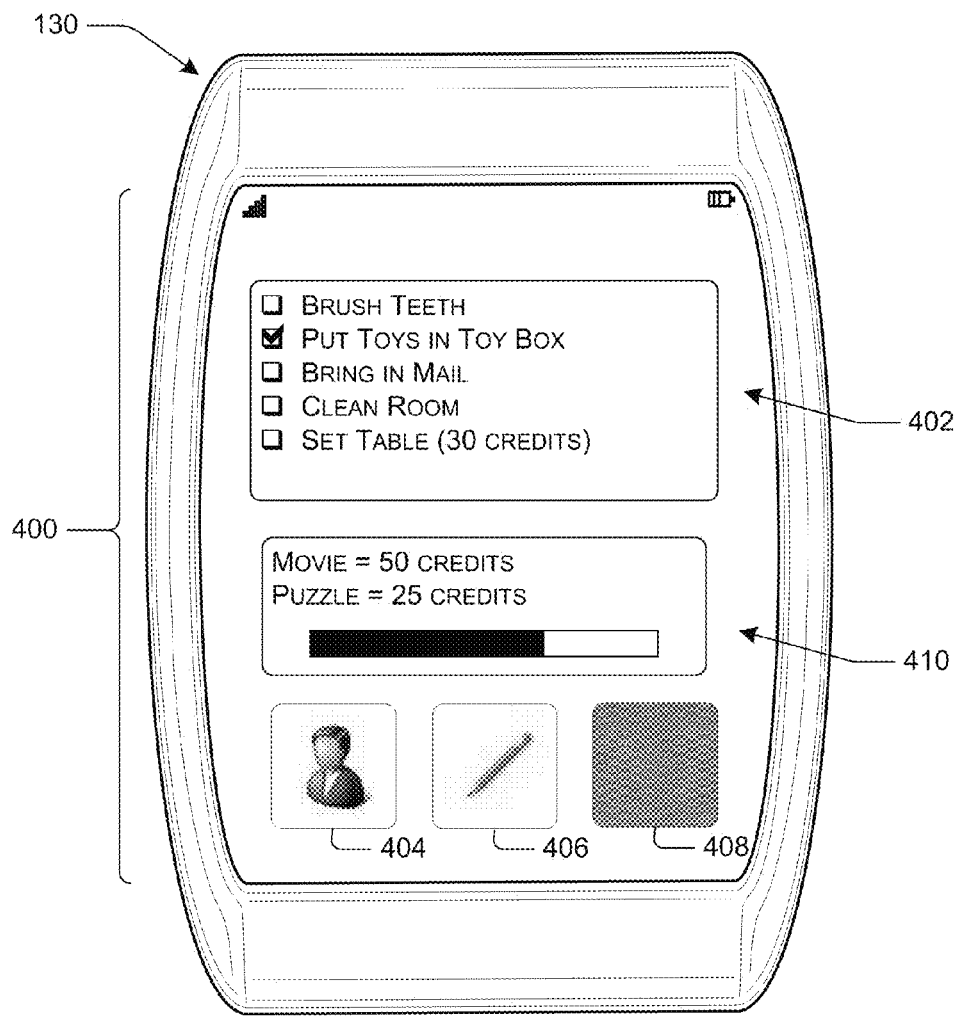
FIG. 4 is an illustration of a chore tracking user interface on a child device.

FIG. 4 is an example of a simplified graphical interactive user interface 400 for the child telecommunications device 130, configured to display chores in a chore list 402. In one embodiment, child device 130 may be a specialized smart phone or other device, designed especially for young children. For example, it might have large keys, bright colors, and be ruggedized to withstand the rough treatment it might receive by children. Furthermore, the operating system and user interface of the child device 130 might be customized for young children through simplification and graphical designs that are more appealing and understandable to children.

In one embodiment, child device 130 might be a tablet-like device having dimensions similar to those of an 8½×11 inch sheet of paper. Rather than keys, such a device might have a touch-sensitive display surface to accept user input.

User interface 400 may include one or more graphical menus that provide access by the user of the child device 130 to different functionalities. The graphical user interface 400 shown in FIG. 4 may have a plurality of graphical icons, corresponding to different functionalities, for example icon 404, for example, comprises a picture of a contact (e.g., a parent, a grandparent, or other contact) whom the user of child device 130 might wish to call. In touchscreen implementations, touching the icon initiates a telephone call to the contact. Icon 406 indicates an application for drawing or writing. Touching the icon launches the application which, in this example, would allow the user of child device 130 to draw or write on the touchscreen display. Icon 408 comprises a game that is initiated when the icon is touched; however icon 408 is shown as gray because the game functionality is not currently available. Use of the game may be restricted, for example, until all chores in the chore list 202 are completed.

The activities presented by user interface 400 and available to the user of child device 130 are configurable and may depend upon completion of chores on the chore list 402. The parent device 128 may be configured to remotely configure the chore list 402 and lock or unlock the specific functionalities available at child device 130. Moreover, the user of the parent device 128 may have alternate interfaces available to configure and customize child device 130, such as a Web interface accessible via any device that accesses the Internet. Specifically, chores displayed on the chore list 402 and the functionalities which are unlocked or enabled when a chore is completed are specified by the user of parent device 128 and then communicated to child device 130. The chores included in the chore list 402 are displayed on the graphical user interface 400 of the child device 130. The child device 130 receives the chores and adds them to the chore list 402 automatically and without participation of the user of child device 130. This allows the user of parent device 128 to assign chores to the user of child device 130 and to incentivize completion of the chores by providing awards in the form of additional functionality on the child device 130. The user of parent device 128 can add or remove chores at any time, upon which they are recommunicated to the child device 130 and the chore list 402 is modified accordingly.

Illustrative chores included in the chore list 402 include brushing teeth, putting toys in a toy box, bringing in the mail, cleaning a room, and setting the table. Any activity a user of the parent device 128 desires a user of the child device 130 to perform may be included as a chore in the chore list 402. Although the examples included herein are generally related to a parent assigning chores to a child, other applications in which a user of a first device provides a task list to a user of a second device are equally suitable for the subject matter of this disclosure.

The user interface 400 may also include a rewards tracker 410 that shows functionalities the user of the child device 130 may access when he or she acquires sufficient credits. These functionalities may be available on an electronic store and the rewards tracker 410 may be an interface that provides direct access to all or part of the electronic store. The rewards tracker 410 may encourage the user of the child device 130 to complete chores by visually showing progress towards a goal. In some implementations, the progress may be shown as ratio of credits earned to credits needed for a goal (i.e., a "thermometer" representation). In other implementations the progress may be indicated as a number of stars, badges, and the like.

Figure 5:
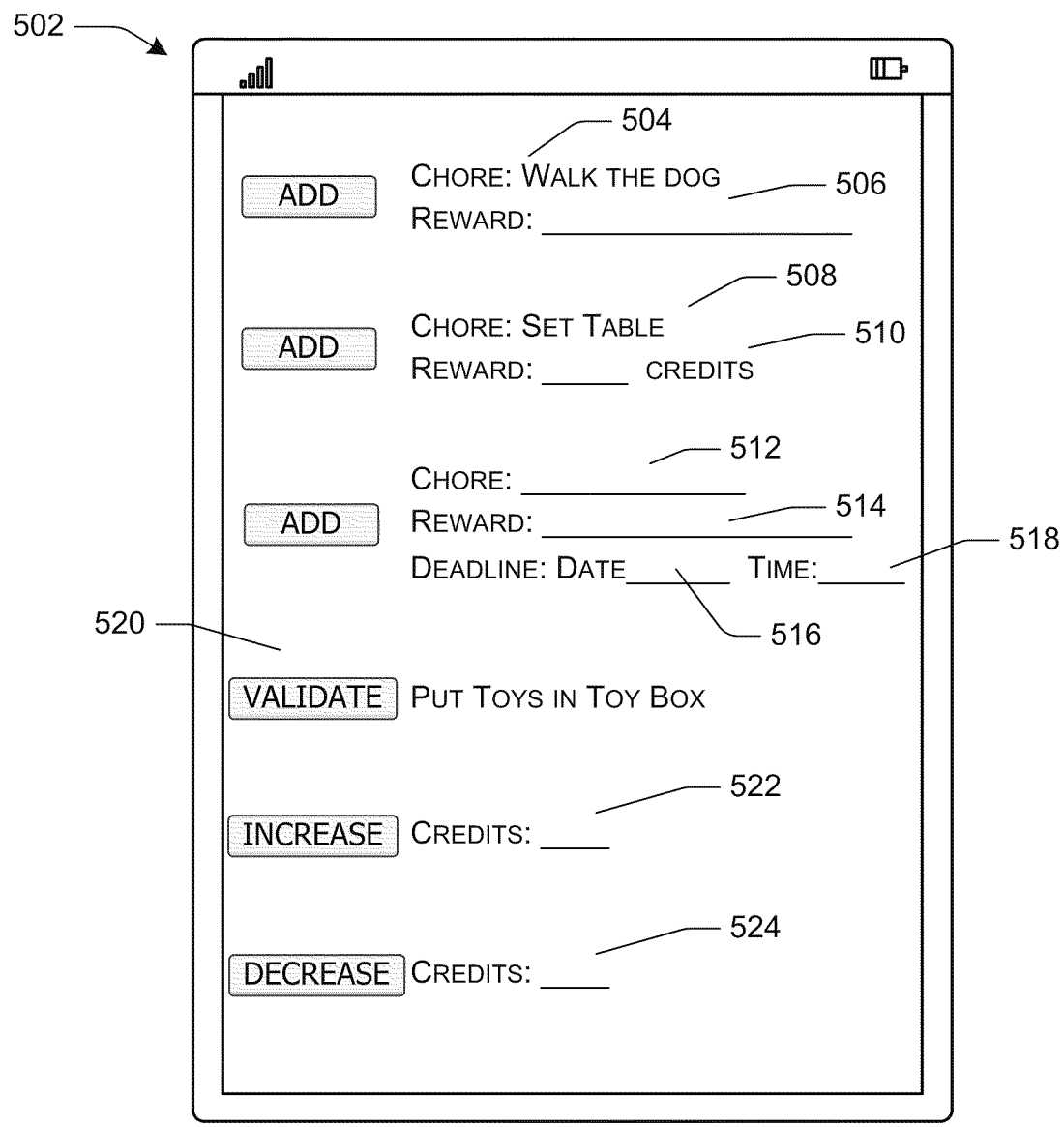
FIG. 5 is an illustration of a user interface on a parent device for assigning chores and rewards to a child device.

FIG. 5 shows an example of how a user interface 502 for assigning chores might be implemented on the parent telecommunications device 128. In this example, the user interface 502 is designed to display a menu to assign chores, validate the completion of chores, and/or modify a number of credits available on the child device 130.

In this example, a first chore 504 comprises "walk the dog." Before adding this chore to the chore list of the child device 130, the user of parent device 128 may enter a reward into the blank space 506. Associating this chore with a reward results in the child device 130 displaying the chore in a list of chores and providing the award by enabling the functionality specified in the blank 506 when the chore 504 is completed.

Another chore 508 comprises "set table." Before adding this activity, the user of parent device 128 may enter any number of credits into the blank space 510. Credits may be used to enable or unlock functionality on the child device 130. Different functionalities may be unlocked by redeeming different numbers of credits. By providing credits rather than tying the completion of the chore to a particular functionality, the user of the parent device 128 allows the user of the child device 130 to have some level of control in choosing his or her reward. When the "set table" chore is added to the chore list on the child device 130, the user interface 400 of the child device 130 in FIG. 4 may also show a number of credits associated with the chore.

In general, the assignment of a chore by the user of the parent device 128 includes identifying the chore in the blank space 512, specifying the reward (functionality or credits redeemable for a functionality) in the blank space 514, and possibly a deadline for completing the chore such as a specific date 516 and/or time 518. In some embodiments, the chore must be completed by the deadline in order for the user of the child device 130 to receive the reward. The chore may be specified by entering text into the blank space 512 or selecting the chore from a menu. The menu may include, for example, common chores that are preloaded as part of the chore and rewards tracker 132 or the menu may be populated with recently assigned chores. Similarly, the reward entered into the blank space 514 may be entered as text or selected from a menu. The deadline may also be entered as text or numerals into fields 516 and 518 or selected from a menu such as a calendar or date-picker tool.

Selecting or pressing the "ADD" button next to any of these chores adds that chore to the chore list. Adding the chore also transmits the corresponding reward to the child device 130 and, if specified, the deadline by which the chore should be completed.

The user interface 502 also allows the user of the parent device 128 to validate the completion of a chore by selecting or pressing the "VALIDATE" button 520. In one embodiment, when the user of the child device 130 indicates that a chore is completed, the completed chore automatically appears on the user interface of the parent device 128 and provides an option for the user of the parent device 128 to validate that the chore was actually completed.

In embodiments that provide credits as a reward, the user of the parent device 128 may increase or decrease a number of credits available on the child device 130. Credits may also be referred to as points, tokens, money, and the like. The user of the child device 130 may redeem the credits for functionality on the child device 130. In one embodiment, a specified number of the credits is consumed to unlock a functionality on the child device 130. For example, setting the table for dinner may earn a child 30 credits that can be used to send 30 text messages to friends at 1 credit per text message. Credits may be directly tied to the completion of a chore such as the credits 510 provided when the chore "set table" 508 is completed. The user of the parent device 128 may also increase or decrease any number of credits available to the user of the child device 130 independent from the assignment and completion of chores. For example, completing a chore particularly well may earn the child more credits than are typically associated with that chore but fighting with siblings may result in the parent taking credits away. Moreover, the parent device 128 may remotely modify the number of credits available on the child device 130 at a specified frequency such as weekly or monthly in a manner that provides credits to the child similar to an allowance or a gift.

The user interface 502 includes a field 522 for entering a number of credits to add to the child device 130. Similarly, a number of credits to remove from the child device 130 may be entered in field 524. Selecting or pressing the "INCREASE" or "DECREASE" button next to fields 522 and 524, respectively, modifies the number of credits available on the child device 130. Changing the number of credits available on the child device 130 may be implemented by any number of alternative user interfaces such as a slider bar, a dial, or the like. The user interface 502 may also show a number of credits available on the child device 130.

Parent device 128 and its user interface 502 might be configured in many different ways to allow more detailed specification of chores and rewards (such as decreasing the number of credits the longer it takes a child to complete the chore, etc.). For example, chores assigned to multiple children, and thus multiple child devices 130, may be simultaneously managed on the parent device 128 and chores may be transferred from one device 130 to another. The users of the multiple child devices 130 may transfer chores among themselves. For example, one child may trade chores with a sibling (e.g., take out the trash for wash the dishes). In some implementations, the user of the parent device 128 may limit the ability to transfer a chore or chores between child devices 130. In other implementations, chores may be available in a shared pool of chores or a "family chore list" that individual users of child devices 130 may elect to transfer to their respective individual chore lists. Chores may also be transferred or copied from one time to another. This allows the user of the parent device 128 to copy a chore and the associated reward from one day to another such as copying "take out the trash" from Monday of one week to Monday of the next week.

Figure 6:
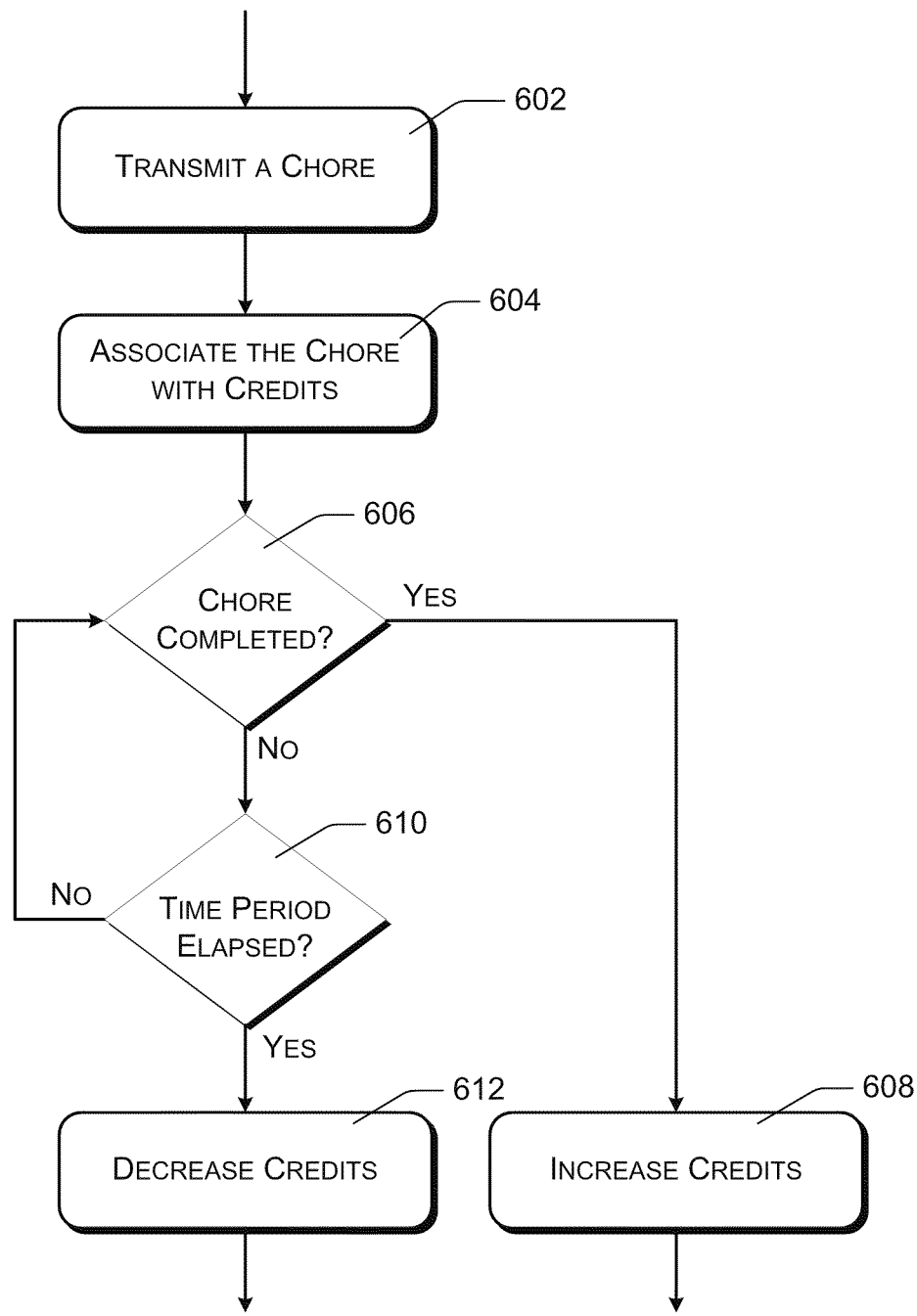
FIG. 6 is a flowchart illustrating a method of increasing or decreasing credits on a child device based on completion of a chore.

FIG. 6 shows an example of actions performed by the chore and rewards tracker 132 to manage a number of credits on a child telecommunications device 130 as described above. An action 602 comprises transmitting a chore to the child device 130 for inclusion in a list of chores 402 indicated on the graphical display 400 of the child device 130. The chore may be transmitted from a telecommunications device, a personal computer, a website, or other parent device 128.

An action 604 comprises associating the chore with a number of credits that enable a user of the child device 130 to access a functionality of the child device 130. More difficult chores may earn the user of the child device 130 a greater number of credits. For example, the chore "brush teeth" may be associated with 5 credits whereas the chore "clean room" may be associated with 15 credits. The credits may be saved or redeemed for functionalities on the child device 130. The user of the parent device 128 determines a numbers of credits required to access a given functionality of the child device 130. Different functionalities on the child device 130 may require different numbers of credits to access. In one embodiment, credits may be exchanged for minutes of talk time on the child device 130 which in this embodiment functions as a mobile telephone. Thus, the parent (i.e., the user of the parent device 128) may limit the amount of time that the child (i.e., the user of the child device 130) talks on the phone by controlling the number of credits and also incentivize completion of chores by providing credits.

A decision 606 comprises determining whether a chore was completed. The determination may be made by the user of the child device 130, the user of the parent device 128, or by both users together. In situations where the parent trusts the child to finish his or her chores, the user of the child device 130 may indicate on the child device 130 that a chore is completed. In other situations, the parent may see that a chore is completed and indicate such on his or her parent device 128. Determining that a chore was completed may also involve the user of the child device 130 indicating that the chore has been completed and a further act comprising validating the indication that the chore was completed. The validation may be performed by the user of the parent device 128.

The number of credits available on the child device 130 are increased at action 608 in response to the indication that the chore was completed. The number of credits may be increased automatically or in response to a command from the user of the parent device 128 as described above.

A further decision 610 determines whether a specified time period for completing the chore has elapsed. As discussed above, the user of the parent device 128 may also specify a deadline that accompanies a chore assignment. In embodiments which include a deadline, the chore tracking module 200 may determine if a chore remains uncompleted when a deadline has passed. If the specified time period for completing the chore has not elapsed then the chore and rewards tracker 132 may return to decision 606 and query whether in the chore is completed. However, when an indication that the chore was completed is not received within the specified time period, the number of credits available on the child telecommunications device are decreased at action 612. The decrease of credits may happen automatically when the time period elapses or may require a command from the user of the parent device 128.

The parent device 128 can remotely modify a number of credits available on the child device 130 in response to an indication that the chore was or was not completed. Specifically, the user of the parent device 128 can reward the user of the child device 130 for completing a chore by increasing credits 608 or penalize the user of the child device 130 for failing to complete a chore in time by decreasing credits 612.

Figure 7:
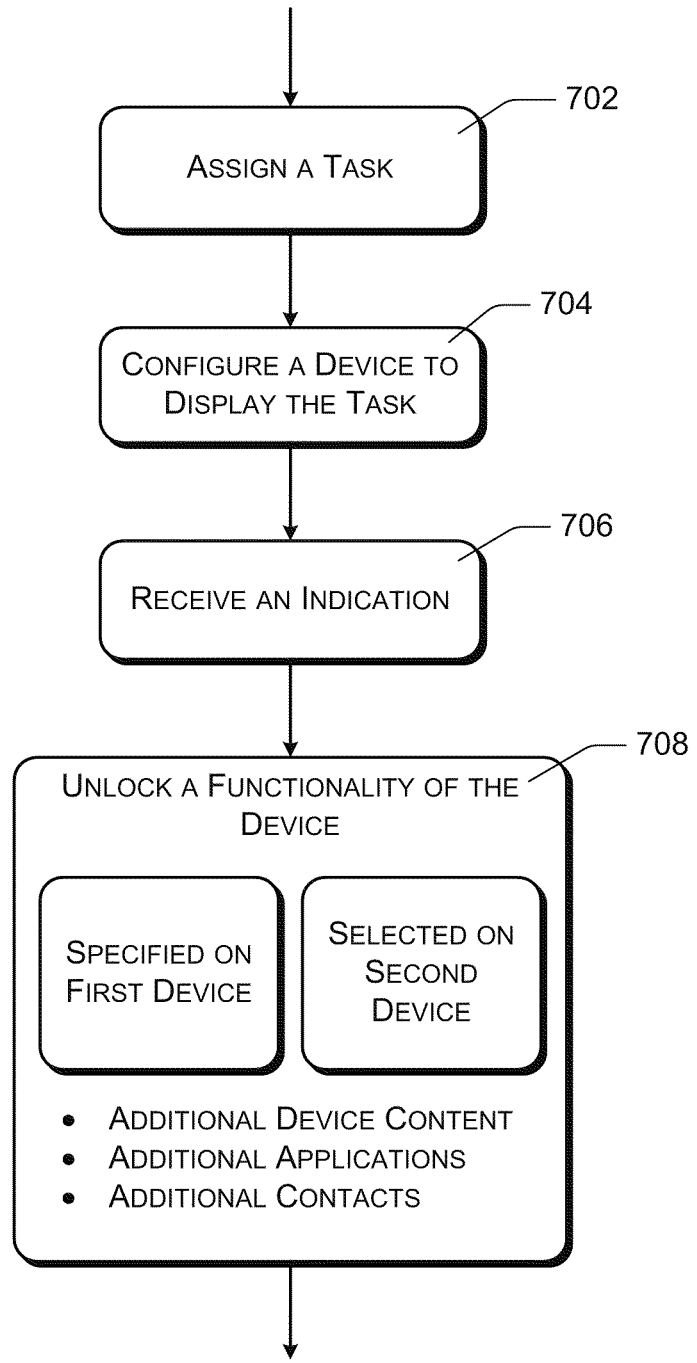
FIG. 7 is a flowchart showing a method of assigning a task to a device and unlocking a functionality of the device.

FIG. 7 shows actions performed by one or more devices utilized to track completion of a task and change the functionality of the device once the task is completed. The actions shown in FIG. 7 may be implemented by the parent device 128 and child device 130 as discussed above; however, a parent-child relationship between the users is not necessary. For example, in a workplace scenario a manager may use his or her device to assign tasks to another device operated by an employee.

An action 702 comprises assigning a task on a first telecommunications device to be completed by a user of a second telecommunications device. The task may be a chore assigned by a parent to a child. In one embodiment, assigning the task also includes designating a functionality that is unlocked when the task is completed.

An action 704 comprises configuring the second telecommunications device to display the task on a user interface of the second telecommunication device. The task may be presented to the user of the second telecommunications device in a task list, a to-do list, as a reminder, or the like. The display may present the task in a window that can be closed or minimized or alternatively the task may be persistently displayed on the telecommunications device until the task is completed.

An action 706 comprises receiving an indication that the task was completed. The indication may be received from a user of the first telecommunications device such as the manager acknowledging or validating that the task was completed correctly. However, in some embodiments the indication may be received from the user of the second telecommunications device. For example, the telecommunications device used by the employee may be configured to accept a command from the employee as sufficient indication that the task was completed. The party that generates the indication may also vary with the task. For example, relatively simple tasks may be marked as completed by the employee himself or herself, but more critical tasks or tasks that require manager review may only be marked as complete by the manager using his or her telecommunications device.

An action 708 comprises unlocking a functionality of the second telecommunications device upon receipt of the indication that the task was completed. The functionality to be unlocked may be specified by the user of the first telecommunications device. Alternatively, the functionality to be unlocked may be selected by the user of the second telecommunications device.

Unlocking the functionality comprises further configuring the second telecommunications device to enable the user of the second telecommunications device to access at least one of additional device content, additional applications, or additional contacts. In one embodiment, the functionality is a "reward" such as described above in the parent-child context. For example, every time an employee completes a sale and marks the corresponding task as complete the second telecommunications device may unlock access to additional device content such as a song. The employee may select the song that is unlocked. When the unlocked functionality is specified on the first device, the user of the first device may specify a functionality such as an executable application to be pushed to the second telecommunications device. The application may be pushed from the first telecommunications device or from a location on the public-private network(s) 106 shown in FIG. 1. Alternatively, unlocking content may be used in order to manage workflow processes rather than to provide "rewards." For example, access to client contacts may be locked until the manager reviews a draft e-mail message and then transmits an indication to the employee's telecommunications device that the "write e-mail to the client" task is complete. This process may prevent the employee from accidentally sending an e-mail to the client that has not yet been reviewed by a manager.

Figure 8:
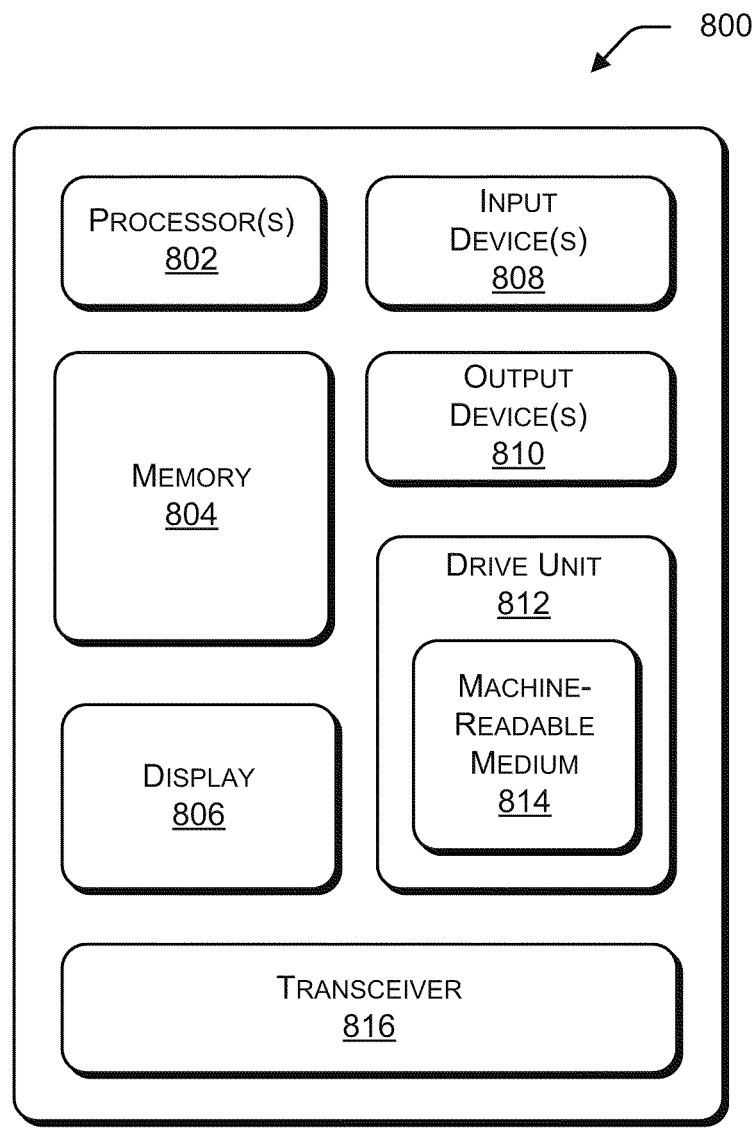
FIG. 8 is a block diagram showing common components of a telecommunications device such as might be used to implement the parent and child devices described herein.

FIG. 8 shows an illustrative telecommunication device 800 such as may be used as either the parent device 128 or the child device 130. Telecommunication device 800 comprises one or more processors 802, a memory 804, a display 806, one or more input devices 808, one or more output devices 810, a drive unit 812 which can access a machine-readable medium 814, and a transceiver 816. Any of the components in this example telecommunications device 800 may be combined with another component, omitted, or replaced with an alternate component. The machine-readable medium 814 may be a tangible and non-transitory type of media such as a flash memory card. The machine-readable medium 114 stores one or more sets of instructions (e.g., software) embodying any one or more of the methodologies or functions described herein such as the chore and rewards tracker 132. The instructions may also reside, completely or at least partially, within the memory 804 and within the processor 802 during execution thereof by the telecommunication device 800. The memory 804 and the processor 802 also may constitute machine-readable media.

In the child telecommunications device 130, for example, the memory 804 and/or machine-readable medium 814 might include an operating system or other program configured to receive chores and to respond by displaying a list of chores on the display 806. In some cases, a program for implementing the chore and rewards tracker 132 might be loaded onto device 800 by a reseller of the device, such as by a service carrier that bundles the device with a service plan. In other cases, the manufacturer of the device might implement the chore and rewards tracker 132 as a native element of the device. Alternatively, the chore and rewards tracker 132 might be part of a program that is installed by an end-user.

In the parent telecommunications device 128, the memory 304 and/or the machine-readable medium 814 might include an operating system or other program configured to interact with a user of parent device 128 to assign chores and corresponding rewards and to send those chores and rewards to the child device 130. Again, this functionality might be included with the native software as the device is manufactured, or added latter by a reseller or an end-user.

The input device(s) 808 may be a keyboard, keypad, touch screen, or microtelecommunications device. Other input device(s) 808 may be used. The display 806 may be a touch-screen display, liquid crystal display (LCD), a flat panel, a solid state display or other device. The processor 802 may be a central processing unit (CPU), a graphics processing unit (GPU), or both CPU and GPU, or other processing unit or component.

The output device(s) 810 may be a speaker or headphone jack for audio output, a vibrator for tactile feedback, or a printer. Other output device(s) 810 may also be used.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

We claim:

1. A child telecommunications device, comprising:
a processor;
a display controlled by the processor that displays a list of chores to a user of the child telecommunications device; and
a memory coupled to the processor, the memory comprising:
a chore tracking module that receives an indication that a chore from the list of chores was completed by the user of the child telecommunications device;
a rewards module that unlocks a functionality of the child telecommunications device in response to the indication that the chore was completed; and
a module that transfers the chore from the child telecommunications device to another child telecommunications device upon mutual agreement of users of the child telecommunications device and the other child telecommunications device.

2. The child telecommunications device as recited in claim 1, wherein the list of chores is received to the child telecommunications device from a parent telecommunications device.

3. The child telecommunications device as recited in claim 1, wherein the functionality comprises device content.

4. The child telecommunications device as recited in claim 3, wherein the device content comprises web sites, audio media, video media, or textual media for consumption on the child telecommunications device.

5. The child telecommunications device as recited in claim 1, wherein the functionality comprises executable applications for execution on the child telecommunications device.

6. The child telecommunications device as recited in claim 1, wherein the functionality comprises communication with users of other devices via the child telecommunications device.

7. The child telecommunications device as recited in claim 1, wherein the memory further comprises:
a validation module that validates completion of a chore.

8. The child telecommunications device as recited in claim 7, wherein the validation module transmits an indication that the chore was completed to a parent telecommunications device and receives a validation from the parent telecommunications device.

9. The child telecommunications device as recited in claim 1, wherein the rewards module unlocks a functionality of the child telecommunications device when all chores on the list of chores are completed.

10. One or more machine-readable media containing instructions that are executable on a computing device to perform actions comprising:

receiving an indication that a chore from a list of chores displayed on a child telecommunications device was completed by a user of the child telecommunications device; and responsive to the indication, providing a reward comprising a functionality on the child telecommunications device to the user of the child telecommunications device, wherein the chore is transferred from a first child telecommunications device to a second child telecommunications device upon mutual agreement of the users of the first child telecommunications device and the second child telecommunications device.

11. The one or more computer-readable media of claim 10, wherein the reward comprises unlocking the functionality on the child telecommunications device responsive to the indication.

12. The one or more computer-readable media of claim 10, wherein the reward comprises providing credits to the user of child telecommunications device responsive to the indication, a specified number of the credits being consumed to unlock the functionality on the child telecommunications device.

13. A method comprising:
receiving, by a child telecommunications device, an indication that a chore from a list of chores was completed by the user of the child telecommunications device;

unlocking, by the child telecommunications device, a functionality of the child telecommunications device in response to the indication that the chore was completed; and wherein the chore was transferred to the child telecommunications device from another child telecommunications device upon mutual agreement of users of the child telecommunications device and the other child telecommunications device.

14. The method as recited in claim 13, further comprising receiving the list of chores from a parent telecommunications device.

15. The method as recited in claim 13, wherein the functionality comprises device content.

16. The method as recited in claim 15, wherein the device content comprises web sites, audio media, video media, or textual media for consumption on the child telecommunications device.

17. The method as recited in claim 13, wherein the functionality comprises executable applications for execution on the child telecommunications device.

18. The method as recited in claim 13, wherein the functionality comprises communication with users of other devices via the child telecommunications device.

19. The method as recited in claim 13, further comprising validating completion of the chore.

20. The method as recited in claim 19, wherein the validating comprises transmitting an indication that the chore was completed to a parent telecommunications device and receiving a validation from the parent telecommunications device.

21. The method as recited in claim 13, wherein the unlocking comprises unlocking the functionality when all chores on the list of chores are completed.

* * * * *